Nov. 1, 1960   H. LOEVENSTEIN   2,958,580
PROCESS FOR THE PRODUCTION OF ALUMINUM SULFATE
Filed May 17, 1955
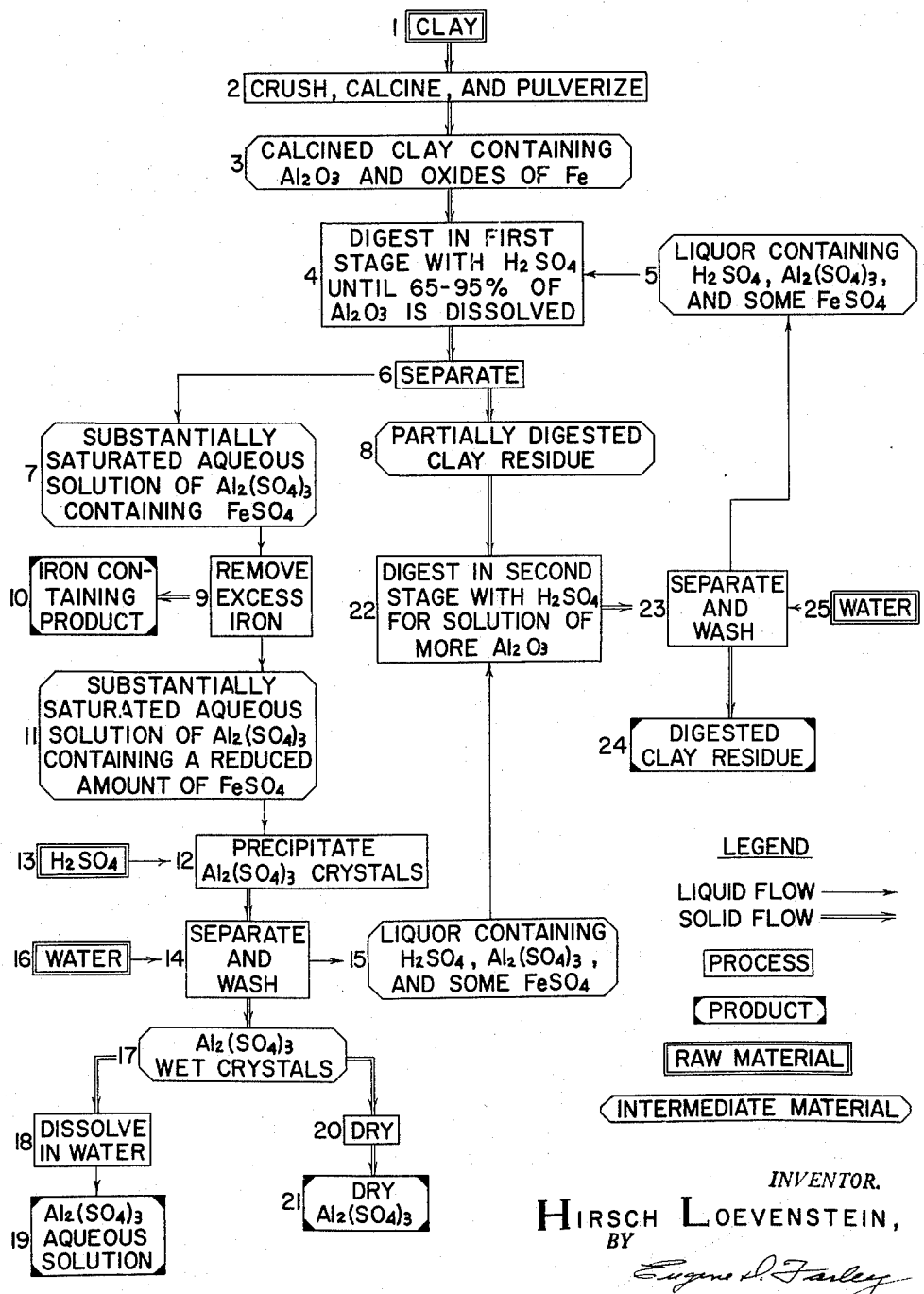
INVENTOR.
HIRSCH LOEVENSTEIN,
BY
ATTORNEY

United States Patent Office 2,958,580
Patented Nov. 1, 1960

2,958,580
PROCESS FOR THE PRODUCTION OF ALUMINUM SULFATE

Hirsch Loevenstein, Salem, Oreg., assignor to Harvey Machine Co., Inc., Torrance, Calif., a corporation of California Filed May 17, 1955, Ser. No. 508,842

3 Claims. (Cl. 23—123)

This invention relates to a process for the production of aluminum sulfate and pertains particularly to a process for the production of aluminum sulfate from clays having a high content of oxides of iron.

Commercial aluminum sulfate suitable for use in its diverse industrial applications potentially may be made by digesting clay with sulfuric acid. This converts the alumina content of the clay to aluminum sulfate which, however, is contaminated with the sulfates of iron and other metals contained in the clay.

Thus a severe limitation is placed on the applicability of this process to the production of aluminum sulfate at low cost because a large proportion of clays contain a substantial percentage of oxides of iron. These are carried into solution along with the alumina during the digesting operation and contaminate the aluminum sulfate product, rendering it unsuitable for use in many applications.

Hence use in this process of low iron content clays heretofore has been practically mandatory in order to produce substantially iron-free aluminum sulfate. Unfortunately, the supplies of clay having a low iron content are severely restricted and are monopolized by the ceramic industry. As a consequence, the producers of aluminum sulfate have neglected clay as a raw material in favor of the white bauxites which likewise may be converted to aluminum sulfate by treatment with sulfuric acid.

However, the use of the white bauxites as starting materials for aluminum sulfate manufacture also is attended by serious disadvantages. They are expensive, since their deposits are limited and their use in other chemical industries substantial. Their deposits are located for the most part a considerable distance away from the major paper mills and other plants which are the principal consumers of aluminum sulfate. As a result, the necessary shipping charges add substantially to the cost of the aluminum sulfate product.

Also, the aluminum sulfate produced from the white bauxites normally contains from .30 to .50% by weight iron oxide. This product currently is accepted by paper mills and other users because its cost is considerably less than that of aluminum sulfate produced by alternate procedures such as those employing aluminum trihydrate as a starting material. Still, it would be preferable to provide an aluminum sulfate having a lower iron oxide content.

Furthermore, when preparing aluminum sulfate from the white bauxites a relatively dilute sulfuric acid solution must be employed to keep at a minimum the quantity of iron oxides which dissolves. As a consequence, the resulting aluminum sulfate solution must be concentrated before it is marketed, or evaporated to dryness for the production of aluminum sulfate powder. This makes necessary an additional processing operation which adds materially to the cost of the product.

However, during the concentration step, at least part of the ferrous iron compounds which are present as contaminants may be oxidized to ferric iron compounds. If the latter are present in the aluminum sulfate product, it may be rendered entirely unsuitable for many commercial uses.

Still another disadvantage attendant upon using white bauxites as a source of aluminum sulfate resides in the fact that when the bauxites are treated with sulfuric acid, the bauxites and not the acid must be used in excess in order to reduce the solubility of any iron oxides which may be present in the bauxites. This reduces the yield of aluminum sulfate and also introduces an excess of alumina into the resulting liquor. As a consequence, when the liquor is evaporated to dryness, the aluminum sulfate powder which is produced has a reduced solubility in water.

As a result of the foregoing serious deficiencies of the prior art process for preparing aluminum sulfate, repeated efforts have been made to find better methods for the production of that material. The most promising of these has relied upon the fact that aluminum sulfate is relatively insoluble in sulfuric acid, whereas ferrous sulfate is quite soluble in that reagent.

Thus, in one procedure, clay having a substantial content of alumina and oxides of iron is digested with sulfuric acid used in twice the amount required theoretically to dissolve the alumina. The resulting hot sulfuric acid solution then is cooled to room temperature. Thereupon the aluminum sulfate precipitates, since its solubility in sulfuric acid decreases greatly with decrease in temperature, leaving the ferrous sulfate contaminant in solution.

The precipitated aluminum sulfate then is separated from the mother liquor by filtration, new acid added, and the resulting acid solution used for the digestion of a further quantity of clay. This procedure has the obvious disadvantage that with each successive digestion the iron concentration of the aluminum sulfate solution increases. Ultimately the solution attains such a high concentration of iron that it contaminates the aluminum sulfate product. Accordingly, this process is not commercially feasible.

In an effort to overcome the disadvantages inherent in the foregoing process, still another process making use of the insolubility of aluminum sulfate in sulfuric acid has been suggested. In this process clay containing a substantial amount of iron oxides is digested with approximately the theoretical amount of sulfuric acid, a slight excess of clay preferably being present. The resulting solution of aluminum sulfate and ferrous sulfate is separated from the clay and cooled. Excess sulfuric acid then is added for precipitation of the aluminum sulfate. The latter is separated from the liquor by filtration, and washed with a concentrated solution of aluminum sulfate which may be obtained from a previous extraction of clay with sulfuric acid. The sulfuric acid solution which remains then may be recycled to the treatment of a further quantity of clay.

In this procedure, as in that described above, the iron content of the solution increases with repeated extractions of fresh quantities of clay. If permitted to continue, this would result in the contamination of the aluminum sulfate with iron. Accordingly, when the iron content of the solution has reached a predetermined maximum, it is oxidized to the ferric state and thereafter the solution is reacted in a separate operation with a large excess of clay. The excess clay thereupon precipitates part of the iron from the solution, removing it from the operation so that a substantially iron-free aluminum sulfate is produced.

However, this process also has obvious disadvantages. Maintaining the clay in excess amount during the digestion reduces the yield of aluminum sulfate obtained. The necessity of reacting the liquor with a large excess of clay from time to time, in order to precipitate the iron, still further reduces the yield of aluminum sulfate. The necessity of oxidizing the iron to the ferric state further complicates the operation and increases its cost.

Accordingly, at the present time there is no economical procedure for converting clays having a high content of iron oxides to a substantially iron-free aluminum sulfate product on a large commercial scale.

The present procedure, therefore, is designed to provide a process for producing aluminum sulfate from clay and other alumina-containing raw materials which process is characterized by the following objects and advantages:

First, it recovers a high yield of alumina from a given amount of raw material.

Second, it produces a substantially iron-free aluminum sulfate from raw materials having a high content of iron oxides.

Third, it produces an aluminum sulfate which dissolves rapidly in water without leaving a solid residue.

Fourth, it is applicable to low cost clays available in large quantities in deposits occurring near plants requiring aluminum sulfate.

Fifth, it produces a crystalline, hydrated aluminum sulfate which can be dried to a product having a relatively high alumina content without reducing its solubility in water.

Sixth, it is versatile in producing directly either a nearly neutral concentrated aluminum sulfate solution or crystalline aluminum sulfate at the option of the operator, without first heating the solution.

Seventh, it may be operated to produce electrolytic iron as a valuable by-product.

Eighth, it is low in cost because it uses cheap raw material located close to the processing site, and because of the simplicity of the operations involved.

The manner in which the foregoing and other objects of this invention are accomplished will be apparent from the accompanying specification and claims, considered together with the drawing consisting of a flow plan illustrating the presently described procedure.

Generally stated, the process of this invention for making aluminum sulfate comprises digesting with sulfuric acid a clay or other alumina-containing raw material contaminated with iron oxide. Thereupon a substantial proportion, but not all, of the alumina and some of the iron oxide are dissolved. The resulting solution of aluminum sulfate containing some ferrous sulfate is separated from the partially digested residue. A substantial proportion of the iron content of the solution then is removed by a suitable procedure, as by electrolysis.

A predetermined amount of concentrated sulfuric acid next is added to the solution of reduced iron content to precipitate crystalline aluminum sulfate. The aluminum sulfate is separated from the residual sulfuric acid-containing liquor. In one embodiment of the invention the liquor, which contains a substantial excess of sulfuric acid, may be cycled to the digestion of a further quantity of raw clay or other alumina-containing material.

In another embodiment of the invention, the sulfuric acid-containing liquor may be cycled to the further digestion of the partially digested residue resulting from the prior digestion step, and the digestion continued until an additional quantity of alumina has dissolved. The resulting solution of aluminum sulfate and excess sulfuric acid then is separated from the resulting digested residue and cycled to the digestion of a further quantity of raw material, the amount of sulfuric acid added during the precipitation step having been predetermined as being sufficient to dissolve the desired amount of alumina from the raw clay in the next cycle of operation. In this manner there is provided a two-step process for converting substantially all of the alumina content of the clay to an aluminum sulfate product of very low iron content, the iron being separated during each digestion cycle and recovered as a valuable by-product.

Considering the foregoing in greater detail and with particular reference to the flow plan:

The herein described procedure for aluminum sulfate production may be applied to a wide diversity of aluminum bearing minerals. Thus, it may be applied to such minerals as the various bauxites and laterites. It is designed for use particularly, however, with the alumina bearing clays which occur in large deposits in numerous locations. These clays may contain substantial proportions, i.e. 5% by weight, or more, of ferrous oxide and/or ferric oxide.

When using clay, the raw material first is crushed to a suitable size, for example to pellets passing a one inch screen. These then are calcined for the purpose of making the clay more reactive toward the sulfuric acid used in a subsequent digesting operation.

The calcining step may be carried out in a kiln, oven or other apparatus suitable for heating solid materials. The clay is placed in the kiln, brought to a temperature of from 600°–900° C., depending on the nature of the clay, and maintained at that temperature for a time sufficient to attain the desired degree of reactivity.

After calcining, the clay is pulverized to a size suitable for efficient digestion with sulfuric acid. In general it may be pulverized to a mesh size of at least —40 mesh, preferably —200 mesh, U.S. Sieve Series. This may be accomplished in a ball mill, hammer mill, or other suitable pulverizing equipment.

Next, the calcined, pulverized clay is digested with sulfuric acid for conversion of its alumina content to aluminum sulfate. In the initial digestion cycle fresh sulfuric acid having a concentration of from 20 to 50% by weight is used. However, after the process has been in operation for at least one digestion cycle, the raw clay is digested with a sulfuric acid-containing liquor resulting from the precipitation of crystalline aluminum sulfate in a subsequent step, as will be explained more fully hereinafter.

The digestion preferably is carried out at an elevated temperature, for example at a temperature of about 50° C. but below the boiling temperature of the mixture. Since the reaction between the clay and the sulfuric acid is exothermic, a suitable reaction temperature may be achieved without the application of heat from an external source.

In the usual case, the digestion is carried out at atmospheric pressure. However, superatmospheric pressures may be applied if desirable or necessary in the digestion of certain clays.

Whether the sulfuric acid comprises fresh acid or a sulfuric acid solution resulting from a prior digestion operation, it is used in an amount which is sufficient to convert to aluminum sulfate only 65% to 95%, preferably only 80% to 95% by weight, of the alumina content of the clay. These limitations are important and critical to the successful operation of the process.

Thus, if less than 65% of the alumina content of the clay is converted to aluminum sulfate the partially digested clay residue is of a muddy consistency which is extremely difficult to separate by filtration or otherwise from the desired aluminum sulfate solution. On the other hand, if more than 95% of the alumina content of the clay is converted to aluminum sulfate, an aluminum sulfate solution of excessively high acidity may be formed. This then would interfere with the satisfactory separation of the iron content of the solution in a subsequent electrolytic step.

Accordingly the digestion of the clay with the calculated amount of sulfuric acid is permitted to continue until the sulfuric acid is substantially spent whereupon from 65–95% by weight of the alumina has dissolved. The resulting clear aluminum sulfate solution then is separated from the clay residue by any suitable means, as by suction filtration or otherwise.

The aluminum sulfate solution produced in this manner contains little if any free acid. It is substantially saturated with respect to aluminum sulfate. Its pH is substantially that of a saturated aluminum sulfate solution, i.e. from 0.3 to 3.0, usually about 2.0. Also, it contains a variable proportion of ferrous sulfate depending upon the iron content of the raw material.

The resulting aqueous solution of aluminum sulfate containing ferrous sulfate next is treated for the removal of at least a proportion of the latter. Any suitable process may be employed to achieve this object, as by displacement of the iron from the iron sulfate by treatment with a suitable chemical reagent.

Preferably, however, the solution is introduced into an electrolytic cell and electrolyzed. This results in the selective separation of electrolytic iron as a valuable by-product. In fact, if the clay starting material contains at least 5% by weight of iron, calculated as $Fe_2O_3$, the value of the iron obtained as a by-product is more than sufficient to underwrite the total cost of the electrolytic procedure.

After treatment for removal of the iron, there remains a substantially saturated aqueous solution of aluminum sulfate containing a substantially reduced amount of ferrous sulfate. This now is treated for the selective precitation of crystalline aluminum sulfate.

As has been indicated above, to achieve this object advantage is taken of the insolubility of aluminum sulfate in cold sulfuric acid, and the solubility of ferrous sulfate in that medium. Accordingly, there is introduced into the aluminum sulfate solution, an amount of sulfuric acid which is sufficient to precipitate a substantial proportion of the aluminum sulfate as well as to provide a predetermined excess of sulfuric acid for use in the digestion of more clay in a subsequent digestion cycle.

The sulfuric acid employed preferably is concentrated, having a concentration of at least 60%, preferably at least 90% by weight. The conventional commercial 66° Be'. sulfuric acid having a concentration of 97% by weight sulfuric acid is entirely suitable for this purpose.

In this connection it should be noted that if the sulfuric acid is too dilute, an insufficient proportion of the aluminum sulfate is precipitated and eliminated from the system. Also, when using concentrated sulfuric acid, the volume of the solution is maintained at a minimum so that more wash water may be employed for washing the aluminum sulfate subsequently without diluting the acid to such an extent that it is unsuitable for use in treating the partially digested clay residue in a subsequent operation.

After precipitation, the crystalline aluminum sulfate is separated from the residual liquor by centrifuging, filtering, or other suitable means. It then is washed with water or a concentrated aluminum sulfate solution. Washing with water is preferred because if the aluminum sulfate solution has been produced in a preceding digestion cycle, it still contains some iron so that the total concentration of iron in the washed crystals would be higher than it is when the crystals are washed with water. Also, washing with water removes the excess sulfuric acid from the aluminum sulfate crystals more efficiently and does not increase the iron content of the crystals.

The amount of wash water employed is correlated with the amount of water contained in the sulfuric acid added during the precipitation step so that there is obtained a sulfuric acid solution containing from 20 to 50% by weight sulfuric acid. This liquor is cycled back to the digestion of the partially digested clay residue, as will be discussed further below.

The aluminum sulfate which has been separated from the liquor is obtained in the form of wet crystals. These may be dissolved in water, to form an aqueous aluminum sulfate solution of any stipulated concentration, applicable to a diversity of industrial uses. If desired, the last wash water employed in washing the crystals may be employed as a solvent for this purpose.

On the other hand, if a dry product is desired, the wet aluminum sulfate crystals may be dried in an oven, in dry atmospheric air, or in a desiccating environment until the desired dry product has been obtained. In either case an aluminum sulfate product may be produced which contains only a trace of iron oxide, even though the starting material contains a large amount of that contaminant.

In the next phase of the herein described process, the sulfuric acid containing some aluminum sulfate and some ferrous sulfate, and resulting from the separation of the precipitated aluminum sulfate, may be added to a further quantity of raw clay or to the partially digested clay residue resulting from the digestion in the first cycle of the raw clay with sulfuric acid. In the latter case a sufficient amount of the liquor is employed not only to dissolve most or all of the alumina remaining in the clay but also to dissolve 65–95% of the alumina contained in a quantity of raw clay to the digestion of which it is recycled.

As in the case of the initial digestion, the reaction preferably is carried out at an elevated temperature. This temperature may be reached spontaneously because of the residual heat content of the clay residue and because of the exothermic character of the reactions involved. However, if necessary, additional heat may be applied externally to accelerate the reaction.

After the digestion of the clay residue with sulfuric acid is complete, the digested clay is separated from the resulting aluminum sulfate solution, preferably by filtration. The clay residue is washed with water and the water washings which contain sulfuric acid, a proportion of aluminum sulfate and some ferrous sulfate, is combined with the filtrate resulting from filtration of the digested clay slurry. The resulting sulfuric acid solution then contains the proper proportion of sulfuric acid for digestion of the raw clay in the first step of the digestion procedure. As has been indicated above, it may be used for this purpose.

Summarizing in terms of the flow plan the foregoing discussion of the presently described procedure for preparing aluminum sulfate from clay:

Clay or other alumina-bearing mineral (1) is crushed, calcined, and pulverized (2) to give a powdered clay product (3) which is stored. From storage the clay is transferred to a digester and digested (4) with a sulfuric acid solution containing aluminum sulfate (5) so that from 65 to 95%, preferably 80 to 95% by weight of the alumina in the clay has dissolved and been converted to aluminum sulfate.

From the resulting slurry there is separated (6) a clear solution (7) of aluminum sulfate which contains ferrous sulfate, and a partially digested clay residue (8). The excess ferrous sulfate is removed from the solution by electrolysis or otherwise (9) to give an iron-containing product (10) which preferably is electrolytic iron.

The resulting substantially saturated aqueous solution (11) of aluminum sulfate which contains a reduced amount of ferrous sulfate then is treated for the precipitation of crystalline aluminum sulfate (12) by the addition of sulfuric acid (13). Sufficient sulfuric acid is added at this stage to precipitate aluminum sulfate and also to provide an excess amount of acid for use in the digestion of a further quantity of clay.

The crystalline aluminum sulfate is separated (14) from the residual liquor (15) containing sulfuric acid and some aluminum sulfate and ferrous sulfate. The separated aluminum sulfate then is washed with water (16) to give wet crystals of aluminum sulfate (17).

The latter may be converted into an aqueous solution or a dry product as desired. To convert them to an aqueous solution they are dissolved in an aqueous solvent (18) in the amount predetermined to give an aqueous solution (19) of the desired concentration. If a dry product is desired, the wet crystals of aluminum sulfate are dried (20) to a desired alumina content, forming a product comprising dry aluminum sulfate (21).

The liquor (15) which contains sulfuric acid and some dissolved aluminum sulfate and ferrous sulfate is fed to the partially digested clay residue (8) in the digester. This mixture may be reacted (22) until substantially all of the alumina remaining in the clay residue has been dissolved and converted to aluminum sulfate. The resulting slurry is separated (23) and the digested clay residue (24) washed with water (25).

The resulting liquor is designated by the numeral (5). It contains excess sulfuric acid and some aluminum sulfate and ferrous sulfate. It may be employed for the digestion of the powdered clay at step (4) as described above.

The process of the present invention is further illustrated by the following examples, wherein the proportions of the constituents are given in % by weight.

EXAMPLE I

Raw clay containing 36.75% alumina and 4.40% iron calculated as ferric oxide was crushed, calcined at 760° and pulverized to −100 mesh. After calcination it contained 45.8% $Al_2O_3$ and 5.47% $Fe_2O_3$. A 4 kg. sample of the powdered calcined product was digested with sulfuric acid having a concentration of 40% used in amount sufficient to convert 90% of the alumina present in the clay to aluminum sulfate. During the digestion the temperature was maintained at about 90° C.

The digestion liquor which contained aluminum sulfate and iron sulfate, was separated hot from the partially digested clay. The resulting clear liquor was substantially saturated with aluminum sulfate but contained substantially no free sulfuric acid. It had a pH of 1.8.

Next the saturated aluminum sulfate solution was electrolyzed for separation of the excess of iron, which was recovered as electrolytic iron.

66° Bé. sulfuric acid then was added to the solution in an amount calculated to be sufficient to digest all of the alumina contained in another 4 kg. samples of clay in a subsequent digestion cycle. This amount of acid was also sufficient to precipitate a substantial part of the aluminum sulfate in the solution in the form of white crystals. The crystals were separated at room temperature from the liquid by filtration, washed with water and dried.

The mother liquor separated from the crystals, mixed with the wash water, contained free sulfuric acid in the amount required for the next digestion cycle and also contained some aluminum sulfate and a minor proportion of ferrous sulfate. It was cycled next to the further digestion of the partially digested clay residue. This resulted in the conversion of a further quantity of the alumina content of the clay to aluminum sulfate.

After separation and washing of the fully digested clay, the resulting liquor, together with the wash water, was used in the digestion of a 4 kg. sample of clay in the next cycle. In all, four cycles were completed under the same conditions, 4 kg. of calcined clay being used in each cycle. After completion of the 4th cycle the remaining mother liquor was analyzed and its aluminum sulfate content added to the total of the recovered aluminum sulfate in order to calculate the total yield in alumina recovered from the clay.

The efficiency of the digestion in extracting the alumina from the clay is indicated by the following data:

Table I

| Cycle | Wt. of Residue (Gr.) | $Al_2O_3$ in Residue (Gr.) | $Al_2O_3$ dissolved (Percent by weight) |
|---|---|---|---|
| 1st | 1,770 | 121.2 | 93.3 |
| 2d | 1,940 | 156.8 | 91.3 |
| 3d | 1,900 | 168.5 | 90.6 |
| 4th | 1,840 | 150.6 | 91.4 |
| Totals | 7,450 | 597.1 | 91.7 |

The following data indicate the high recovery of aluminum sulfate obtained:

Table II

| Cycle | Wt. of $Al_2(SO_4)_3$ Crystals (Gr.) | $Al_2O_3$ Content of Crystals (Gr.) |
|---|---|---|
| 1st | 5,770 | 995.3 |
| 2d | 7,480 | 2,190.9 |
| 3d | 9,070 | 1,557.5 |
| 4th | 10,150 | 1,750.0 |
| Mother Liquor* | | 829.6 |
| Total | | 6,423.3 |
| Average yield percent | | 89.22 |

*The aluminum sulfate remaining in the mother liquor normally will be recovered in subsequent digestion cycles.

The efficiency of the precipitation step, when preceded by an electrolytic operation for the removal of part of the iron, in producing an aluminum sulfate product of low iron content, is indicated by the following data which give the iron content of the liquor after electrolysis, but before precipitation of the aluminum sulfate; and also the iron content of the aluminum sulfate crystalline product (both calculated on the basis that the crystals contain 17.25% by weight $Al_2O_3$):

Table III

| Cycle | $Fe_2O_3$ Content (percent by weight) | |
|---|---|---|
| | Liquor | $Al_2(SO_4)_3$ Product |
| 1st | .36 | .033 |
| 2d | .42 | .030 |
| 3d | .34 | .027 |
| 4th | .32 | .023 |

In the above operations 392 gr. of iron was recovered in the form of electrolytic iron, which represents 70.6% of the total iron contained in the clay. 8.0% remained in the clay residue. The rest of the iron was contained in the mother liquor, which normally is recycled.

EXAMPLE 2

In a two-cycle operation, a calcined clay containing 36.15% alumina and 7.09% ferric oxide was used. In this operation the recovery of alumina from the clay was 97.2% and the recovery of alumina in the form of aluminum sulfate crystals was 93.3%.

In this case also, as in the procedure of Example 1, the aluminum sulfate product contained at least 17.25% $Al_2O_3$ and less than about 0.03% by weight $Fe_2O_3$, irrespective of the fact that the clay starting material contained less alumina and more iron than the clay used as the starting material in the procedure of Example 1.

Accordingly, it will be apparent that by the present invention, I have provided a process for recovering alumina from clay or other alumina containing raw material which has many advantages in that it produces a high yield of aluminum sulfate even through an excess of clay is used in the first digestion step wherein a substantially saturated, nearly neutral aluminum sulfate solution is obtained. It produces a substantially iron free or even a chemically pure aluminum sulfate from clays containing over 5% iron. It produces a crystalline aluminum sulfate containing a very high proportion of alumina. It produces electrolytic iron as a valuable by-product. In addition, the process is very economical to operate since it uses an inexpensive raw material which is available in large quantities close to the processing site, and may be carried out easily and rapidly.

Having thus described my invention in preferred embodiments, I claim:

1. The process of making aluminum sulfate comprising digesting a batch of mineral containing alumina and an iron oxide with aqueous sulfuric acid solution containing from 20 to 50% by weight of sulfuric acid in a quantity only sufficient to convert 65 to 95% of the aluminum present to aluminum sulfate, continuing the digestion until substantially all of the acid is exhausted and a residue together with a substantially acid free saturated solution of aluminum sulfate containing iron sulfate is formed, treating the solution to remove a substantial part of the iron content thereof, adding to the solution of aluminum sulfate thus formed sufficient concentrated sulfuric acid to completely digest a fresh batch of mineral similar to said first mentioned batch whereby a substantial proportion of the aluminum sulfate is precipitated, separating the precipitate from the mother liquor, washing the precipitate with wash water and adding the wash water to the mother liquor to form digestion acid solution, digesting the residue of the first step with the digestion acid solution to dissolve the residual aluminum values therein and form a digested clay residue and second digestion acid solution, separating the digested clay residue from the second digestion acid solution, washing the clay residue with sufficient wash water so that when combined with the second digestion acid solution an aqueous sulfuric acid solution will be formed for recycle to the first step to digest said fresh batch of mineral.

2. The process of claim 1 wherein the initial aqueous sulfuric acid solution contains a quantity of sulfuric acid only sufficient to convert 80 to 95% of the aluminum present to aluminum sulfate.

3. The process of claim 1 wherein the iron content is removed by electrolysis.

References Cited in the file of this patent

UNITED STATES PATENTS

| | | |
|---|---|---|
| 1,170,418 | Coolbaugh et al. | Feb. 1, 1916 |
| 1,489,362 | Moxham | Apr. 8, 1924 |
| 1,604,427 | Spicer | Oct. 26, 1926 |
| 2,476,979 | Hoeman | July 26, 1949 |

FOREIGN PATENTS

| | | |
|---|---|---|
| 8,271 | Great Britain | of 1839 |

OTHER REFERENCES

Edwards, Frary and Jeffries: "The Aluminum Industry," vol. 1, "Aluminum and Its Production," 1st ed., 1930, McGraw-Hill Book Co., N.Y., pp. 182–184, 187 and 208.